United States Patent
Steinmetz et al.

(10) Patent No.: US 6,292,732 B1
(45) Date of Patent: Sep. 18, 2001

(54) ADAPTIVE ON-COMING CLUTCH FILL CONTROL FOR AN AUTOMATIC TRANSMISSION

(75) Inventors: Todd M Steinmetz, Indianapolis; Jeffrey Kurt Runde, Fishers, both of IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/566,713

(22) Filed: May 9, 2000

Related U.S. Application Data

(63) Continuation-in-part of application No. 09/531,848, filed on Mar. 20, 2000.

(51) Int. Cl.$^7$ .............................. G06F 17/00; G06F 19/00; G06F 7/00
(52) U.S. Cl. ................................. 701/67; 701/51; 701/66; 477/152; 477/155; 192/109 F; 475/120
(58) Field of Search .................................. 701/51, 52, 66, 701/67; 340/606; 477/39, 116, 152, 155; 192/87.13, 109 F; 60/431, 452; 475/120

(56) References Cited

U.S. PATENT DOCUMENTS

| | | | |
|---|---|---|---|
| 4,428,259 | * 1/1984 | Kubo et al. ............................. | 477/65 |
| 4,707,789 | 11/1987 | Downs et al. ...................... | 364/424.1 |
| 5,072,390 | 12/1991 | Lentz et al. ........................ | 364/424.1 |
| 5,216,606 | 6/1993 | Lentz et al. ........................ | 364/424.1 |
| 5,601,506 | 2/1997 | Long et al. ........................... | 475/120 |
| 6,116,391 | * 9/2000 | Kremling et al. .................. | 192/3.58 |
| 6,129,188 | * 10/2000 | Friedmann et al. ................ | 192/3.58 |

* cited by examiner

*Primary Examiner*—William A. Cuchlinski, Jr.
*Assistant Examiner*—Gertrude Arthur
(74) *Attorney, Agent, or Firm*—Laura C. Hargitt; Leslie C. Hodges

(57) ABSTRACT

An improved on-coming clutch fill control method in which a model of the transmission hydraulic system is used for control purposes to accurately predict the achievement of on-coming clutch torque capacity based on a comparison of the modeled volume of supplied fluid to a reference volume representing the actual volume of the on-coming clutch, and in which the reference volume for each type of shift is adaptively adjusted based on input speed aberrations observed during shifting. If input speed flaring occurs due to an underestimated reference volume, the reference volume is adaptively increased based on the volume of fluid supplied to the on-coming clutch between the initial detection of flaring and a detection of maximum flaring. If the input speed does not flare, but an early pull-down or overlap is detected, the reference volume is adaptively decreased based on the volume of fluid supplied to the on-coming clutch between the initial detection of pull-down or overlap and the expected achievement of on-coming clutch torque capacity.

10 Claims, 6 Drawing Sheets

| RANGE \ CLUTCH | C1 | C2 | C3 | C4 | C5 |
|---|---|---|---|---|---|
| 1st | X | | | | X |
| 2nd | X | | | X | |
| 3rd | X | | X | | |
| 4th | X | X | | | |
| 5th | | X | X | | |
| 6th | | X | | X | |
| R | | | X | | X |
| N | | | | | X |

ADAPTIVE ON-COMING CLUTCH FILL CONTROL FOR AN AUTOMATIC TRANSMISSION

RELATED APPLICATIONS

This is a continuation-in-part of co-pending U.S. patent application Ser. No. 09/531,848 now pending, filed on Mar. 20, 2000, and assigned to the assignee of the present invention.

TECHNICAL FIELD

This invention relates to a shift control for an automatic transmission, and more particularly to a method of adaptively adjusting the fill control of an on-coming clutch.

BACKGROUND OF THE INVENTION

In general, a motor vehicle automatic transmission includes a number of gear elements and selectively engageable friction elements (referred to herein as clutches) that are controlled to establish one of several forward speed ratios between the transmission input and output shafts. The input shaft is coupled to the vehicle engine through a fluid coupling such as a torque converter, and the output shaft is coupled to the vehicle drive wheels through a differential gearset.

Shifting from a currently established speed ratio to new speed ratio involves, in most cases, disengaging a clutch (off-going clutch) associated with the current speed ratio and engaging a clutch (on-coming clutch) associated with the new speed ratio. Each such shift includes a fill or preparation phase during which an apply chamber of the on-coming clutch is filled in preparation for torque transmission. Once filled, the on-coming clutch transmits torque in relation to the clutch pressure, and the shift can be completed using various control strategies.

Typically, the fill phase is carried out by commanding a given on-coming clutch fill pressure for an empirically determined fill time. See, for example, the U.S. Pat. No. 4,707,789 to Downs et al., issued on Nov. 17, 1987, and assigned to the assignee of the present invention. In Downs et al., the fill time for any given clutch is obtained from a look-up table as a function of the commanded fill pressure, less the clutch return spring pressure, and then adjusted as a function of fluid temperature to compensate for variations in fluid viscosity. Another approach is found in the U.S. Pat. No. 5,216,606 to Lentz et al., issued on Jun. 1, 1993, and assigned to the assignee of the present invention. In Lentz et al., where the fill time is determined by table look-up based on the pump speed, as compensated for efficiency and fluid viscosity, and further modified based on the time since the last shift and a hydraulic restriction factor.

It has additionally been recognized that control strategies of the above-described type cannot effectively account for vehicle-to-vehicle manufacturing variations or for variations that occur within a given vehicle over time due to wear, changing fluid characteristics, etc. For this reason, various control methods have been developed for adaptively adjusting the stored table look-up values in order to compensate for sources of error that influence the fill time. In the aforementioned U.S. Patent to Downs et al., for example, the inertia phase delay of the shift is monitored, and used to form an adaptive fill time correction for subsequent similar shifts if the monitored delay significantly deviates from a desired value. Another approach is described in the U.S. Pat. No. 5,072,390 to Lentz et al., issued on Dec. 10, 1991, and also assigned to the assignee of the present invention. There, the input speed is monitored to detect an aberrant event such as flaring, early pull-down or sharp deceleration, and the stored fill time for shifts of that type is adaptively adjusted based on the time difference between expected end of fill and the detection of the aberrant event.

A drawback of the above-described control methods is that they depend extensively on empirically determined data, and the shift parameter (fill time) represented by the stored table values is influenced by numerous unmeasured variables. As a result, the source of a detected fill time error usually cannot be determined, and it is difficult to know how much authority or gain should be accorded to the adaptive adjustment.

SUMMARY OF THE INVENTION

The present invention is directed to an improved on-coming clutch fill control method in which a model of the transmission hydraulic system is used for control purposes to accurately predict the achievement of on-coming clutch torque capacity based on a comparison of the modeled volume of fluid supplied to the on-coming clutch to a reference volume representing the actual volume of the on-coming clutch, and in which the reference volume for each type of shift is adaptively adjusted based on input speed aberrations observed during shifting. If input speed flaring occurs due to an underestimated reference volume, the reference volume is adaptively increased based on the volume of fluid supplied to the on-coming clutch between the initial detection of flaring and a detection of maximum flaring. If the input speed does not flare, but an early pull-down or overlap is detected, the reference volume is adaptively decreased based on the volume of fluid supplied to the on-coming clutch between the initial detection of pull-down or overlap and the expected achievement of on-coming clutch torque capacity. Additionally, iteration is used to minimize the reference volume by gradually reducing the reference volume when there are no detectable aberrant shift characteristics.

DESCRIPTION OF THE PREFERRED EMBODIMENT

The control of this invention is described in the context of a multi-ratio power transmission having a planetary gears et of the type described in the U.S. Pat. No. 4,070,927 to Polka, and having an electro-hydraulic control of the type described in U.S. Pat. No. 5,601,506 to Long et al. Accordingly, the gearset and control elements shown in FIG. 1 hereof have been greatly simplified, it being understood that further information regarding the fluid pressure routines and so on may be found in the aforementioned patents.

Figures 1, 2:
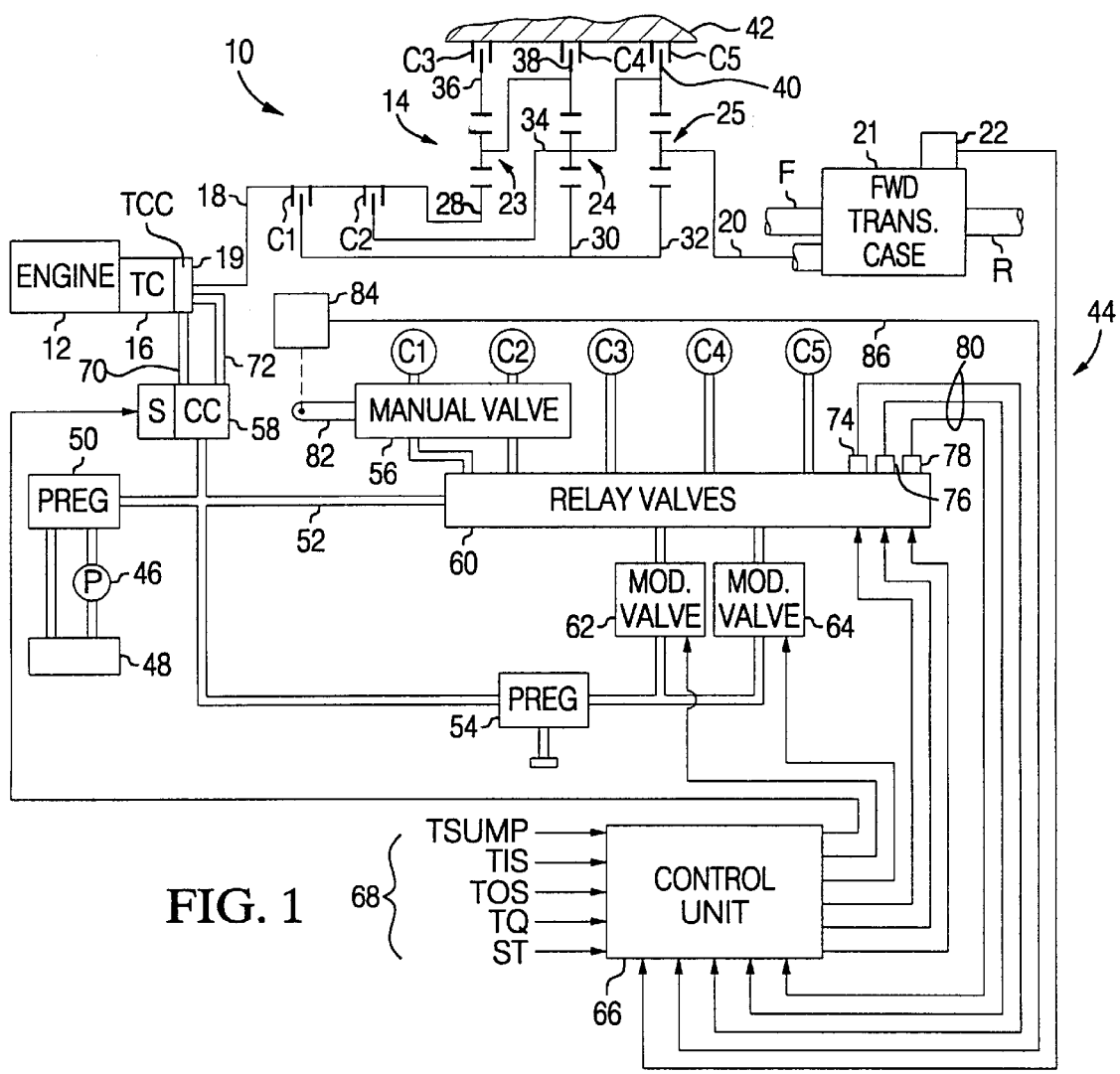
FIG. 1 is a diagram of an automatic transmission and microprocessor-based control unit for carrying out the control of this invention.
FIG. 2 is a table indicating a relationship between transmission clutch activation and corresponding speed ratio.

Referring to FIG. 1, the reference numeral 10 generally designates a vehicle power train including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FAD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagrammed in FIG. 2, the state of the clutches C1–C5 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging clutches C1 and C5. Shifting from one forward speed ratio to another is generally achieved by disengaging one clutch (referred to as the off-going clutch) while engaging another clutch (referred to as the on-coming clutch). For example the transmission 14 is shifted from first to second by disengaging clutch C5 while engaging clutch C4.

The torque converter clutch 19 and the transmission clutches C1–C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid operated fluid control valves 58–64.

The electronic portion of the control is primarily embodied in the transmission control unit 66, which is microprocessor-based, and conventional in architecture. The transmission control unit 66 controls the solenoid operated fluid control valves 58–64 based on a number of inputs to achieve a desired transmission speed ratio. Such inputs include, for example, signals representing the transmission input speed TIS, a driver torque command TQ, the transmission output speed TOS, and the hydraulic fluid temperature Tsump. Sensors for developing such signals may be conventional in nature, and have been omitted for simplicity.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, the fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid operated fluid control valves 58–64 are generally characterized as being either of the on/off or modulated type. To reduce cost, the electro-hydraulic control system 44 is configured to minimize the number of modulated fluid control valves, as modulated valves are generally more expensive to implement. To this end, a set of three on/off relay valves, shown in FIG. 1 as a consolidated block 60, are utilized in concert with manual valve 56 to enable controlled engagement and disengagement of each of the clutches C1–C5 with only two modulated valves 62, 64. For any selected ratio, the control unit 66 activates a particular combination of relay valves 60 for coupling one of the modulated valves 62, 64 to the on-coming clutch, and the other modulated valve 62, 64 to the off-going clutch.

The modulated valves 62, 64 each comprise a conventional pressure regulator valve biased by a variable pilot pressure that is developed by current controlled force motor. The fluid controlled valve 58 is also a modulated valve, and controls the fluid supply path to converter clutch 19 in lines 70, 72 for selectively engaging and disengaging the converter clutch 19. The transmission control unit 66 determines pressure commands for smoothly engaging the on-coming clutch while smoothly disengaging the off-going clutch to shift from one speed ratio to another, develops corresponding force motor current commands, and then supplies current to the respective force motors in accordance with the current commands.

As indicated above, each shift from one speed ratio to another includes a fill or preparation phase during which an apply chamber of the on-coming clutch is filled in preparation for torque transmission. Fluid supplied to the apply chamber compresses an internal return spring, and once filled, strokes a piston to contact the clutch plates, developing torque capacity beyond the initial return spring pressure. Thereafter, the clutch transmits torque in relation to the clutch pressure, and the shift can be completed using various control strategies. The usual control strategy involves commanding a maximum on-coming clutch pressure for an empirically determined fill time, and then proceeding with the subsequent phases of the shift. See, for example, the aforementioned U.S. Pat. Nos. 4,707,789 and 5,216,606, which patents are incorporated herein by reference. These patents recognize that the fill time for a given shift can change depending on various factors, resulting in poor shift quality. If the predetermined fill time is too short, the on-coming clutch does not have sufficient torque capacity when the off-going clutch is released, resulting in engine flare prior to the next phase of the shift; if the predetermined fill time is too long, the on-coming clutch will develop significant torque capacity before the off-going clutch is released, resulting in an early pull-down or clutch overlap condition. Accordingly, various strategies, including adaptive controls, have been developed to bring the predetermined fill times in closer alignment with the actual fill times.

Figure 3:
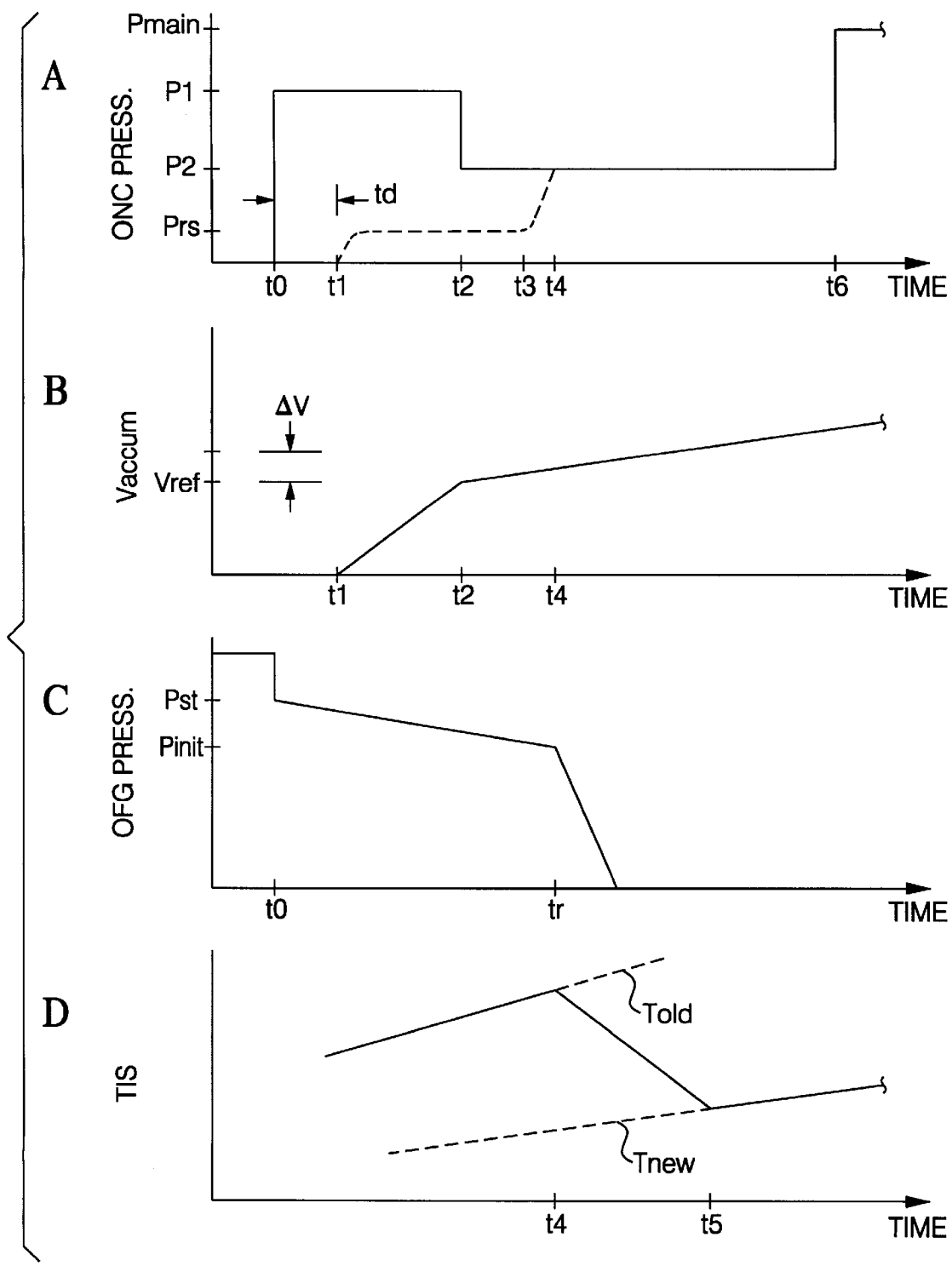
FIG. 3, Graphs A, B, C and D, depict on-coming clutch pressure, cumulative fluid volume supplied to the on-coming clutch, off-going clutch pressure, and input speed, respectively, for an up shift with the correct reference volume.
Figure 4:
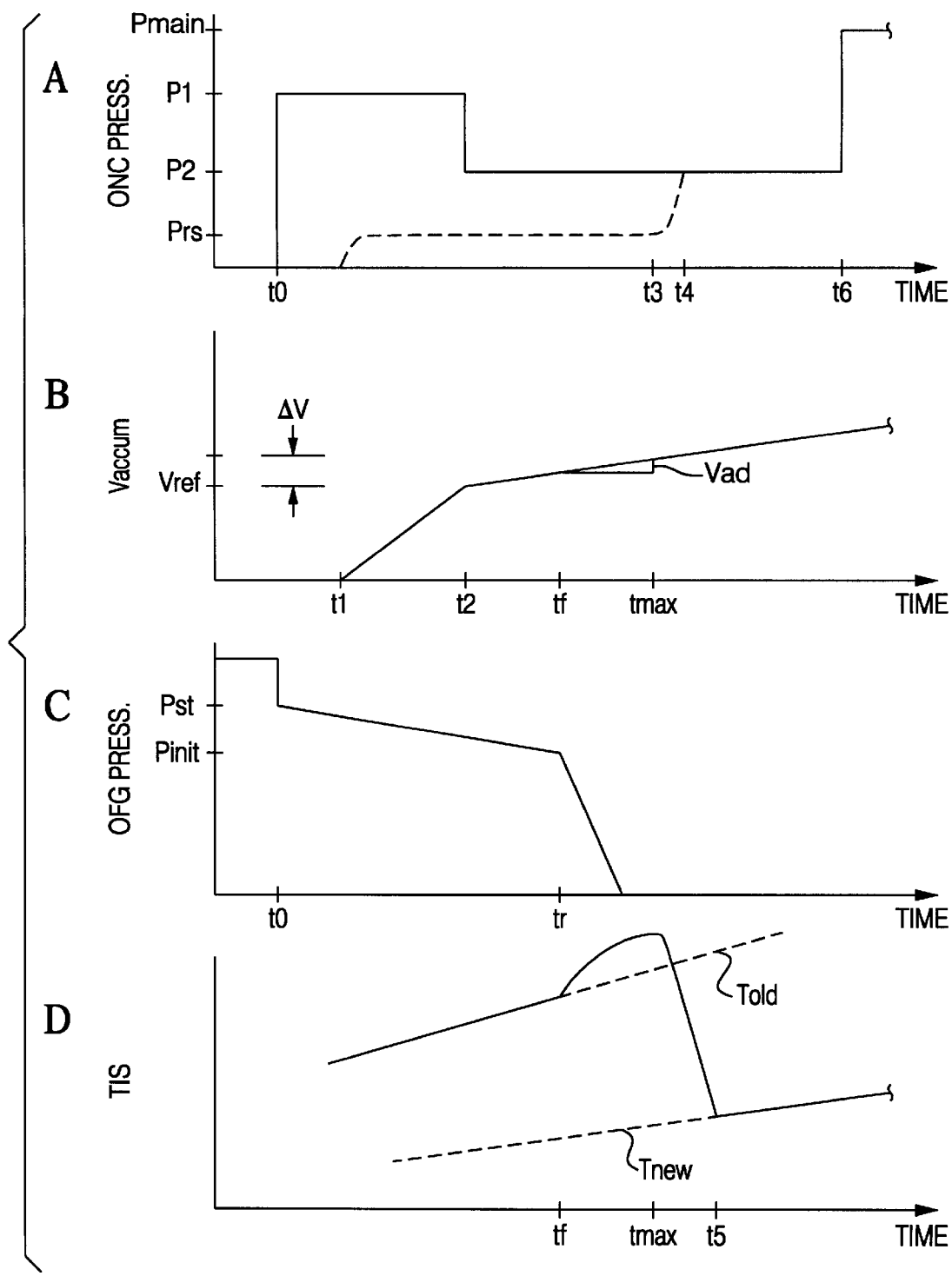
FIG. 4, Graphs A, B, C and D, depict on-coming clutch pressure, cumulative fluid volume supplied to the on-coming clutch, off-going clutch pressure, and input speed, respectively, for an up shift with an under-estimated reference volume.
Figure 5:
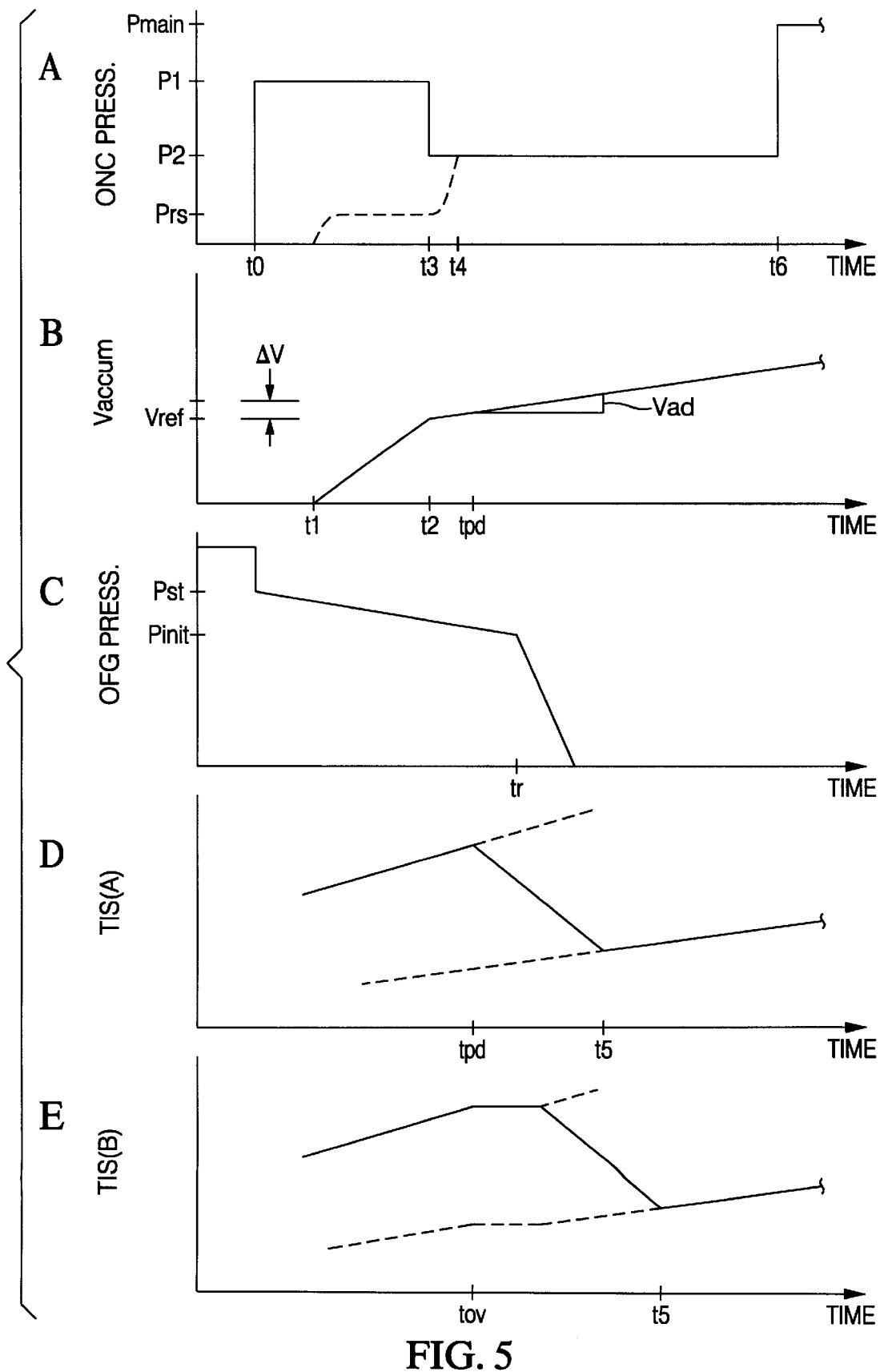
FIG. 5, Graphs A, B, C, depict on-coming clutch pressure, cumulative fluid volume supplied to the on-coming clutch, and off-going clutch pressure, respectively, for an up shift with an over-estimated reference volume. Graph D depicts input speed in the case of a detected early pull-down, and Graph E depicts input speed in the case of a detected early overlap.

The present invention is directed to a different and improved control strategy in which a model of the transmission hydraulic system is used for control purposes to accurately predict the achievement of on-coming clutch torque capacity based on a comparison of the modeled volume of supplied fluid to a reference volume representing the actual volume of the on-coming clutch, and in which the reference volume for each type of shift is adaptively adjusted based on input speed aberrations observed during shifting. FIGS. 3, 4 and 5 graphically illustrate upshifts in which the reference volume is accurate, under-estimated, and over-estimated, respectively.

Referring to FIG. 3, Graph A depicts the pressure command for the on-coming clutch (solid trace) and actual on-coming clutch pressure (broken trace), Graph B depicts the cumulative volume (Vaccum) of hydraulic fluid supplied to the on-coming clutch, Graph C depicts the pressure command for the off-going clutch, and Graph D depictes the speed (TIS) of the transmission input shaft. The interval t0–t4 defines the fill phase, and the shift is completed in the ensuing interval t4–t6. Referring to Graph A, the fill phase is initiated at time t0 by commanding the fill pressure P1 for the on-coming clutch, and a starting pressure Pst for the off-going clutch. The fill pressure P1 may be selected based on various considerations, depending on how quickly the on-coming clutch is to be filled. Significantly, however, the fill pressure P1 is scheduled low enough to ensure that there is a known and predictable relationship between the commanded fill pressure and actual fluid flow. If the fill pressure is sufficiently high (at the main regulated control pressure Pmain, for example), the supply of fluid to the on-coming clutch tends to be flow restricted, significantly altering the relationship between the commanded fill pressure and the actual fluid flow. After a short delay td (defined by the interval t0–t1) due to the combined delays of the electrical and hydraulic portions of the system 44, hydraulic fluid begins to accumulate in the apply chamber, as indicated by the broken actual pressure trace in Graph A and the increase in cumulative fluid volume in Graph B. However, the actual clutch pressure remains at a low level Prs dictated by the internal return spring during such interval. When the cumulative fluid volume supplied to the on-coming clutch reaches the reference volume Vref at time t2, the commanded on-coming clutch pressure is reduced to a trim pressure having an initial value of P2, as indicated by the solid trace in Graph A and the reduced slope of the cumulative volume trace in Graph B. The trim pressure is the desired pressure for the next phase (or phases) of the shift, and may be adjusted over time depending on the particular control strategy utilized. In FIG. 3, the trim pressure remains substantially constant over the interval t2–t6, whereafter the on-coming pressure is increased to the main control pressure Pmain. At time t3, the clutch piston begins to compress the clutch plates, and the clutch pressure quickly rises to the commanded level in the interval t3–t4. At such point, the on-coming clutch has sufficient capacity to initiate the inertia phase of the shift; the off-going clutch is released as seen in Graph C, and the transmission input shaft speed decelerates from a trajectory Told dictated by the old or current speed ratio to a trajectory Tnew dictated by the new speed ratio as seen in Graph D. At time t5, the speed change is complete, and at time t6, the on-coming pressure is increased to the main control pressure Pmain as mentioned above.

As indicated above, the off-going clutch is ideally released as soon as the on-coming clutch achieves its commanded torque capacity. While such timing is ordinarily difficult to achieve, we have found that the point of on-coming torque capacity can be consistently and reliably predicted in terms of the volume of fluid ($\Delta V$) supplied to the on-coming clutch once the reference volume Vref has been reached. The differential volume $\Delta V$ is fixed for any given clutch geometry, and is represented in Graph B as an offset volume in excess of Vref. Thus, the off-going clutch is released at a time tr when Vaccum reaches a threshold defined by the sum (Vref+$\Delta V$). As described below, this relationship is used to advantage in adaptively decreasing Vref when Vref is over-estimated.

FIG. 4, Graphs A–D, graphically illustrate an up shift in which the reference volume Vref is under-estimated. In this case, the on-coming pressure command is decreased to P2 too early, and more importantly, the off-going clutch is released before the on-coming clutch achieves the commanded torque capacity. This results in an input flare condition, as shown in Graph D, where the input speed TIS rises above the old gear trajectory Told, and is pulled down toward the new gear trajectory Tnew only when the on-coming clutch actually achieves capacity at time t4. In other words, maximum flare speed at time tmax coincides substantially with the achievement of on-coming clutch torque capacity at time t4. Thus, under-estimation of Vref can be recognized by the detection of input flare after releasing the off-going clutch, and according to this invention, Vref is adaptively increased under such conditions based on the volume of fluid supplied to the on-coming clutch between times tf and tmax. Such volume of fluid is designated in Graph B as the adaptive volume Vad, and if fully applied to Vref, the next shift of the same type would be carried out with Vref equal to the sum (Vref+Vad).

FIG. 5, Graphs A–E, graphically illustrate an up shift in which the reference volume Vref is over-estimated. In this case, the on-coming pressure command is decreased to P2 too late, and more importantly, the off-going clutch is released after the on-coming clutch achieves the commanded torque capacity. This results in either an early pull-down (as illustrated in Graph D) or a clutch overlap condition (as illustrated in Graph E), depending on whether the off-going clutch has sufficient torque capacity to maintain the old or current speed ratio. In Graph D, an early pull-down is detected at time tpd, whereas in Graph E, an early overlap condition is detected at time tov. Thus, over-estimation of Vref can be recognized by the detection of early pull-down or clutch overlap, and according to this invention, Vref is adaptively decreased under such conditions based on the volume of fluid supplied to the on-coming clutch between the early pull-down or overlap condition and the expected achievement of on-coming clutch torque capacity, which coincides with the release of the off-going clutch. Such volume of fluid is designated in Graph B as the adaptive volume Vad, and if fully applied to Vref, the next shift of the same type would be carried out with Vref equal to the difference (Vref–Vad).

Figure 6:
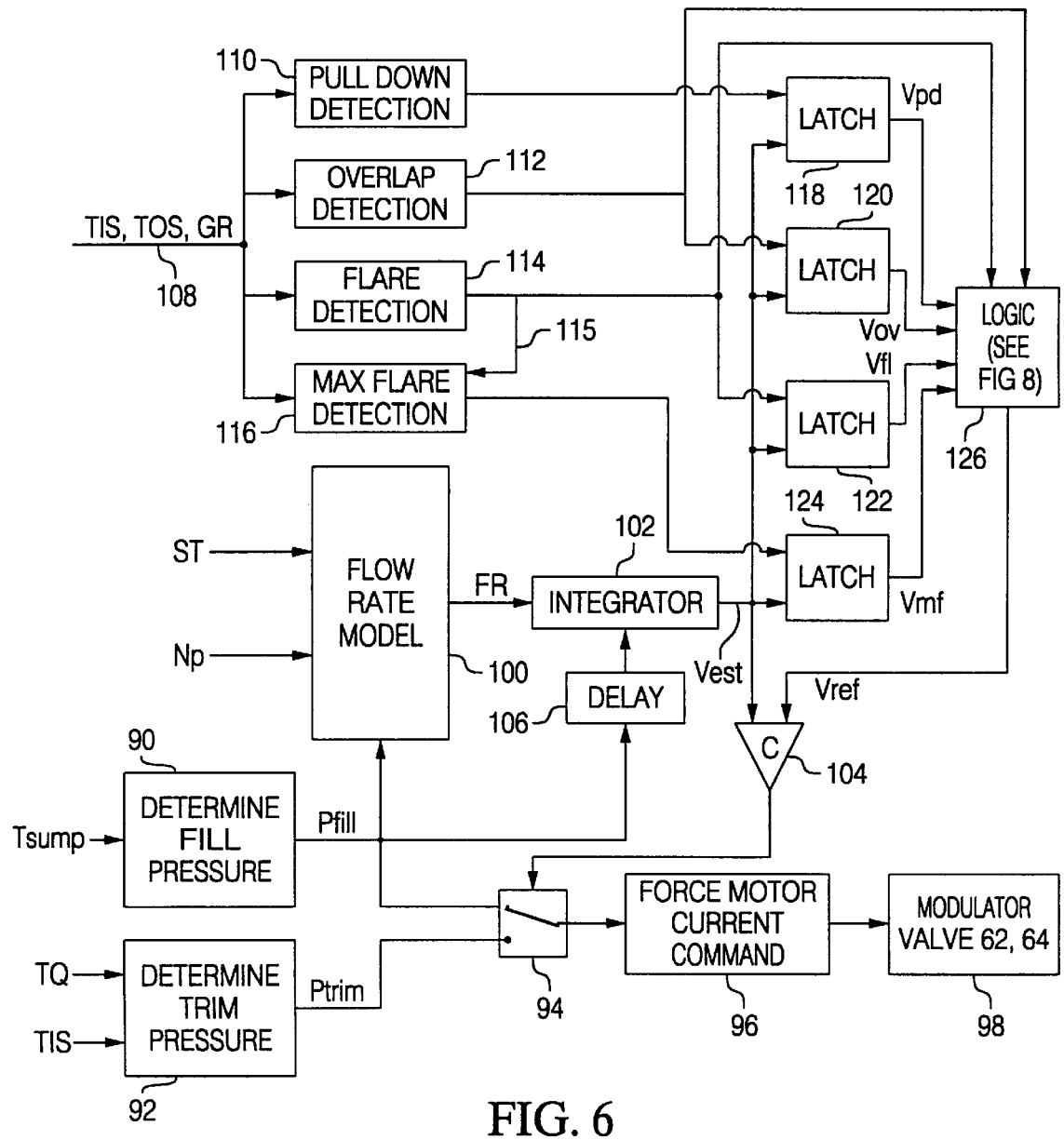
FIG. 6 is a block diagram illustrating the control of this invention as carried out by the control unit of FIG. 1.
Figure 7:
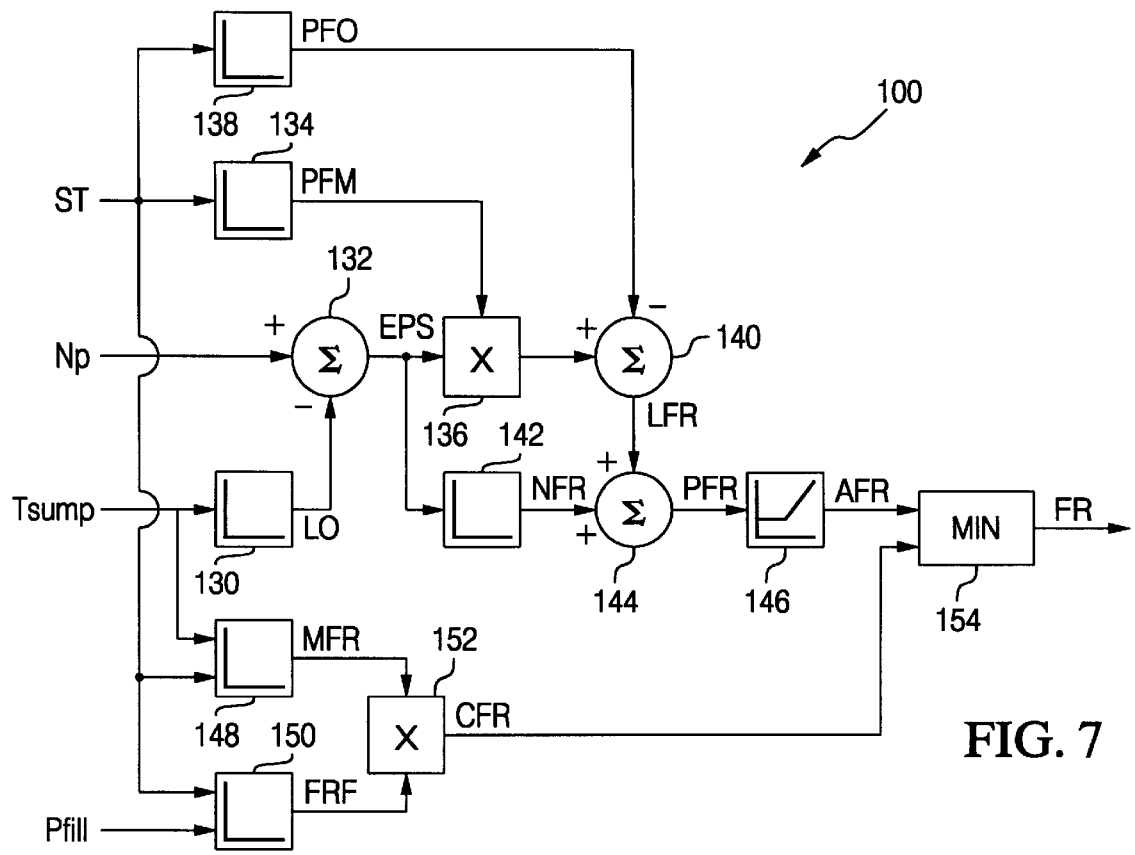
FIG. 7 is a block diagram detailing a flow rate model of FIG. 6.
Figure 8:
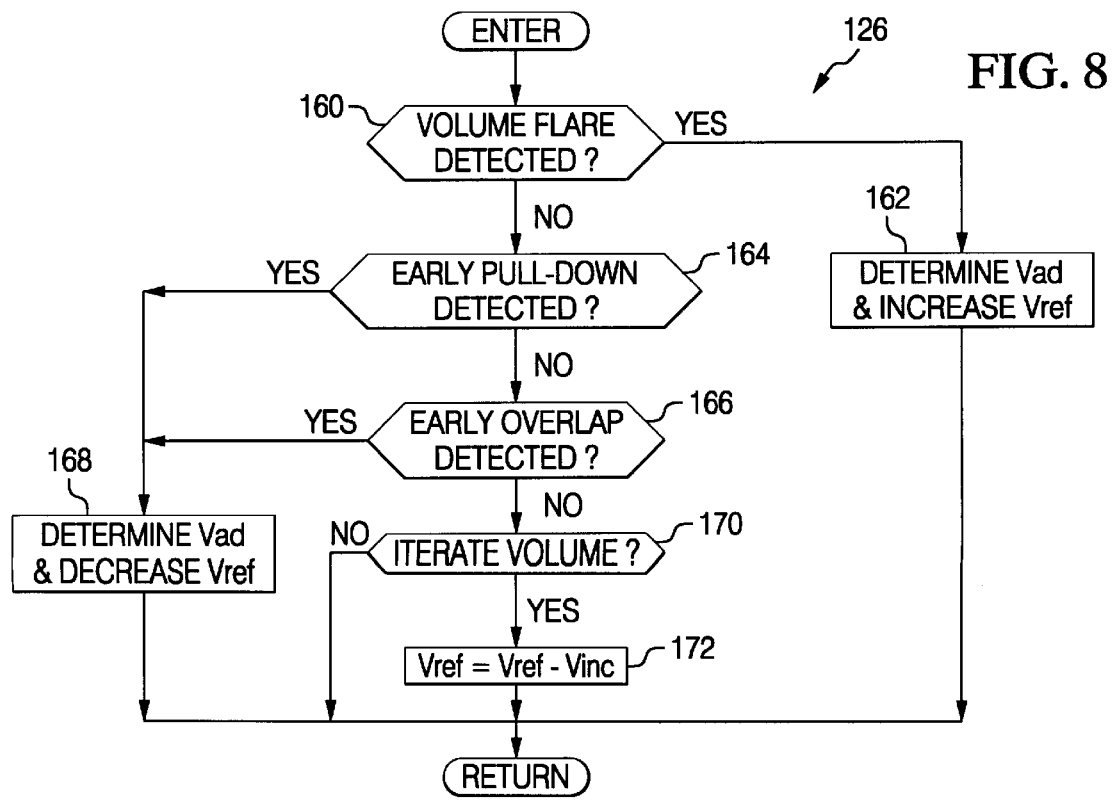
FIG. 8 is a flow diagram illustrating a logic function of the block diagram of FIG. 6.

FIGS. 6–8 illustrate, in block and flow diagram form, a control as described above in reference to the graphs of FIGS. 3–5. FIG. 6 depicts the overall shift control, FIG. 7 depicts the flow rate model of FIG. 6 in more detail, and FIG. 8 illustrates a logic function of FIG. 6 in flow diagram format.

Referring to FIG. 6, the blocks 90 and 92 respectively determine on-coming clutch pressure commands Pfill and Ptrim for the fill and subsequent phases of the shift. As indicated at block 90, the fill pressure Pfill may be determined as a function of the fluid temperature Tsump. In general, a high value of Pfill causes the on-coming clutch apply chamber to be filled more quickly, enabling faster shift initiation. As noted above in reference to FIG. 3, however, the fill pressure Pfill is limited to ensure that there is a known and predictable relationship between the Pfill and actual fluid flow. The trim pressure Ptrim typically varies during the shift and may be determined based on driver torque demand TQ and transmission input speed TIS, using any of a number of known techniques, such as disclosed in the above-mentioned U.S. Pat. Nos. 4,707,789 and 5,216,606. Both Pfill and Ptrim are applied as inputs to a switch 94, which selects one of such inputs for application to the blocks 96 and 98. The block 96 converts the selected pressure command to a force motor current command, and block 98 represents the modulator valve 62, 64 that is coupled to the on-coming clutch.

The operation of switch 94 is controlled by the blocks 100–126, which estimate the volume of fluid (Vest) supplied to the apply chamber of the on-coming clutch, and compare it to a reference volume Vref. The switch is controlled to select Pfill until Vest reaches Vref, whereafter switch 94 is controlled to select Ptrim. The estimated cumulative volume Vest is determined by the blocks 100–106. The block 100 represents a hydraulic flow model of the fluid supply paths for the various clutches C1–C5, and develops an on-coming clutch flow rate FR. Integrator 102 integrates the flow rate FR to form Vest, and the delay block 106 holds the integrator 102 at zero for a predetermined delay interval td beginning at the start of the fill phase to account for the electro-hydraulic delay phenomenon described above in reference to Graphs A and B of FIG. 3. The comparator block 104 compares Vest to the reference volume Vref, and controls the switch 94 as described above.

The flow rate model (block 100) is described in further detail in FIG. 7. Referring to FIG. 7, the model inputs include the fill pressure Pfill, the shift type ST (for example, a 1–2 upshift), the speed Np of pump 46, and the temperature Tsump of the hydraulic fluid. The model includes a first portion comprising the blocks 130–146 for estimating the maximum available pump flow rate AFR, a second portion comprising the blocks 148–152 for estimating the commanded flow rate CFR, and a minimum value (MIN) block 154 for setting the estimated flow rate FR equal to the lower of AFR and CFR.

The maximum available pump flow rate AFR is based on the shift type ST, the pump speed Np and the fluid temperature Tsump. The fluid temperature Tsump is applied to the table block 130, which characterizes the pump leakage in terms of a pump speed, referred to as a leakage offset LO. The summer 132 subtracts the leakage offset LO from the measured pump speed Np (which may be derived from the transmission input speed TIS) to form the effective pump speed EPS.

The pump flow rate PFR is characterized as a function of the effective pump speed EPS, including both linear and non-linear components. The linear component LFR is determined by the blocks 134–140, and the non-linear component NFR is determined by the block 142, with the two components being summed by the summer 144 to form pump flow rate PFR. The linear component LFR includes a proportionality or slope parameter (pump flow multiplier PFM) defined by the table block 134, and an offset parameter (pump flow offset PFO) defined by the table block 138, both PFM and PFO being stored as a function of shift type ST. The slope parameter PFM represents a flow rate per unit pump speed, and is multiplied by the effective pump speed EPS at multiplier 136. The offset parameter PFO represents a pump speed that occurs before any flow is available, and is subtracted from the output of multiplier 136 at summer 140 to form the linear flow rate component LFR. The non-linear flow rate component NFR is stored in table block 142 as a function of the effective pump speed EPS. Finally, the pump flow rate PFR is applied to a limit block 146 to form the maximum available flow rate AFR. The block 146 imposes a minimum value on AFR; this ensures that a positive flow rate is supplied to integrator 102 for stability purposes.

The commanded flow rate CFR is based on the shift type ST, the fluid temperature Tsump and the commanded fill pressure Pfill. The table block 148 outputs the maximum flow rate MFR for each type of shift if the maximum allowable fill pressure is commanded. This takes into account the valve and hydraulic passage geometries for each shift type ST, and the fluid temperature Tsump. The table block 150 provides a flow rate factor FRF which is applied to the maximum flow rate MFR by multiplier 152 to scale MFR based on the commanded fill pressure Pfill, yielding the commanded flow rate CFR. The factor FRF is also a function of the shift type ST so that the orifice characteristics of each type of shift can be taken into account.

As indicated above, the block 154 selects the minimum of the commanded flow rate CFR and the maximum available flow rate AFR in forming the estimated flow rate FR. If the commanded flow rate CFR is less than the maximum available flow rate AFR, the estimated flow rate FR is the commanded flow rate CFR; however, if the commanded flow rate CFR is greater than the maximum available flow rate AFR, the estimated flow rate FR is limited to the maximum available flow rate AFR. This addresses conditions where the pump speed Np is too low to produce the expected flow rate at the commanded fill pressure.

Referring back to FIG. 6, the blocks 110–126 adaptively adjust a predetermined and clutch-specific volume to form the reference volume Vref. More particularly, the blocks 110–126 operate to monitor specified shift characteristics, to determine an adaptive correction amount Vad when an aberrant shift characteristic is identified, and to adaptively adjust Vref based on all or part of Vad. The blocks 110–116 detect the various aberrant input speed conditions described above in reference to FIGS. 4–5, and trigger the respective latches 118–124 to store the value of Vest at the time the respective condition is detected. Thus, the latch 118 stores the volume Vpd in effect when block 110 detects an input speed pull-down, the latch 120 stores the volume Vov in effect when block 112 detects a clutch overlap condition, the latch 122 stores the volume Vfl in effect when block 114 detects an input flare condition, and the latch 124 stores the volume Vmf in effect when block 116 detects the maximum flare speed. The outputs of blocks 112–116, along with the latched volumes (if applicable), are supplied as inputs to the logic block 126, which determines the adaptive correction amount Vad when an aberrant shift characteristic is identified, and adaptively adjusts Vref based on all or part of Vad. The functionality of logic block 126 is described in detail below in reference to the flow chart of FIG. 8.

The aberrant input speed conditions indicated at blocks 110–116 may be detected based on a number of inputs provided on line 108, including the input speed TIS, the output speed TOS, and the current gear ratio GR. An input speed pull-down condition is detected by comparing the input speed TIS to the trajectory Told of the current gear ratio, which in turn is defined by the product (TOS * GR). If TIS is significantly less than the trajectory Told, the block 110 indicates an input speed pull-down. A clutch overlap condition is detected by computing the input acceleration based on changes in TIS, and comparing the acceleration to a reference acceleration established at shift initiation. If the computed acceleration falls below the reference acceleration by a defined amount (which may vary with engine output torque and commanded on-coming clutch torque), the block 112 indicates a clutch overlap condition. An input flare condition is detected by comparing TIS to the trajectory Told of the current gear ratio. If TIS is significantly greater than the trajectory Told, the block 114 indicates an input flare condition; in such event, the block 116 is enabled via line 115 to monitor TIS for the maximum flare value. When the maximum flare value is reached, the block 116 signals the latch 124 as described above.

Referring to FIG. 8, the functionality of the logic block 126 will now be described. Initially, the decision block 160 determines if a volume flare (that is, an input speed flare due to under-estimation of Vref) has been detected. A volume flare is detected if block 114 has detected a flare condition, and:

$$Vfl-(Vref+\Delta V)>K1$$

where K1 is a calibration constant. Thus, a detected input speed flare is considered to be a volume flare if it occurs after the expected achievement of on-coming clutch torque capacity (that is, after the release of the off-going clutch). Otherwise, the detected input speed flare is considered to occur due to insufficient off-going clutch torque capacity. If block 160 is answered in the affirmative, the block 162 is executed to determine the adaptive correction Vad and to increase Vref accordingly. The maximum adaptive correction amount is determined according to the volume of fluid supplied to the on-coming clutch between the initial detection of flaring and a detection of maximum flare; that is, the difference (Vmf−Vfl). Preferably, a fractional gain factor is applied to the difference (Vmf−Vfl) to form the adaptive correction Vad; this allows the gain factor (and therefore the authority of the adaptive correction) to vary depending on the extent to which the reference volume has already been adaptively corrected. In general, the adaptive authority (and therefore, the gain factor) is relatively high initially, and is then reduced over time as the adapted reference volume zeroes in on its fully corrected value. A representative gain scheduling technique is disclosed in the aforementioned U.S. Pat. No. 5,072,390 to Lentz et al., which is incorporated herein by reference.

If decision block 160 is answered in the negative, and either of blocks 164 or 166 are answered in the affirmative, the block 168 is executed to determine an adaptive correction Vad and to adaptively decrease Vref accordingly.

The block 164 determines if an early input speed pull-down (that is, an input speed pull-down due to over-estimation of Vref) has been detected. An early pull-down is detected if:

$$Vpd-(Vref+\Delta V)<K2$$

where K2 is a calibration constant. Thus, a detected input speed pull-down is considered to be early if it occurs prior to the expected achievement of on-coming clutch torque capacity. Otherwise, the pull-down is considered to be either normal or late.

The block 166 determines if an early clutch overlap condition (that is, an overlap condition due to over-estimation of Vref) has been detected. An early overlap condition is detected if block 112 has ected an overlap condition, and:

$$Vov-(Vref+\Delta V)<K3$$

where K3 is a calibration constant. Thus, a detected overlap condition is considered to be early if it occurs prior to the expected achievement of on-coming clutch torque capacity. Otherwise, the detected overlap is considered to be either normal or late.

If an early pull-down or an early overlap condition is detected, the maximum adaptive correction amount is determined at block 168 according to the volume of fluid supplied to the on-coming clutch between the detected event (pull-down or overlap) and the release of the off-going clutch; that is, Vpd−(Vref+ΔV) or Vov−(Vref+ΔV). As described above in reference to block 162, a fractional gain factor is preferably applied to the maximum adaptive correction amount to form the adaptive correction Vad, allowing the control unit 66 to vary the authority of the adaptive correction depending on the extent to which the reference volume has already been adaptively corrected.

If blocks 164 and 166 are answered in the negative, the block 170 is executed to determine if reference volume iteration is desired. Iteration in this sense refers to a gradual reduction of the reference volume Vref when no related aberrant shift characteristics are identified. When implemented, Vref eventually becomes under-estimated, resulting in an input speed flare condition, which in turn, is adaptively corrected as described above. This allows Vref to be minimized if there are no detectable aberrant shift characteristics. Thus, if block 170 is answered in the affirmative, the block 172 adjusts Vref downward by an incremental amount Vinc.

In summary, the control of this invention provides an improved on-coming clutch fill control method in which a flow rate model of the transmission hydraulic system is used for control purposes to accurately predict the achievement of on-coming clutch torque capacity based on a comparison of the modeled volume of supplied fluid to an adaptively adjusted reference volume representing the actual volume of the on-coming clutch. If input speed flaring occurs due to an underestimated reference volume, the reference volume is adaptively increased based on the volume of fluid supplied to the on-coming clutch between the initial detection of flaring and a detection of maximum flaring. If the input speed does not flare, but an early pull-down or overlap is detected, the reference volume is adaptively decreased based on the volume of fluid supplied to the on-coming clutch between the initial detection of pull-down or overlap and the expected achievement of on-coming clutch torque capacity. Finally, iteration is used to minimize the reference volume by gradually reducing the reference volume when there are no detectable aberrant shift characteristics. While described in reference to the illustrated embodiment, it will be understood that various modifications in addition to those mentioned above will occur to those skilled in the art. By way of example, the flow rate determination may be different than disclosed, as may the authority of the adaptive corrections (i.e., gain selection) and the techniques for identifying shift aberrations. Thus, it will be understood that control methods incorporating these and other modifications may fall within the scope of this invention, which is defined by the appended claims.

What is claimed is:

1. A control method for an automatic transmission including an on-coming clutch that is filled with hydraulic fluid in a preparation phase of shifting, and a controller for supplying hydraulic fluid at a commanded pressure to the on-coming clutch during the preparation phase, the method comprising the steps of:

determining a cumulative volume of hydraulic fluid supplied to the on-coming clutch;

comparing the determined cumulative volume to a reference volume representing a volume estimate for the on-coming clutch volume;

predicting the achievement of on-coming clutch torque capacity when the determined cumulative volume exceeds the reference volume by a predetermined incremental amount;

monitoring an input speed of an input shaft of the transmission to detect an aberration due to under-estimation or over-estimation of the reference volume; and adaptively adjusting the reference volume in response to a detected aberration so that the reference volume more nearly represents an actual volume of the on-coming clutch.

2. The control method of claim 1, wherein the step of adaptively adjusting the reference volume includes the step of:

increasing the reference volume when the detected aberration is characterized by a flare in the input speed after the predicted achievement of on-coming clutch torque capacity.

3. The control method of claim 2, including the steps of:

determining a fluid volume error according to an amount by which the determined cumulative volume increases between an initial detection of the input speed flare and a subsequent detection of maximum input speed flare; and increasing the reference volume as a function of the determined fluid volume error.

4. The control method of claim 1, wherein the step of adaptively adjusting the reference volume includes the step of:

decreasing the reference volume when the detected aberration is characterized by a pull-down of the input speed prior to the predicted achievement of on-coming clutch torque capacity.

5. The control method of claim 4, including the steps of:

determining a fluid volume error according to an amount by which the determined cumulative volume increases between an initial detection of the input speed pull-down and the predicted achievement of on-coming clutch torque capacity; and decreasing the reference volume as a function of the determined fluid volume error.

6. The control method of claim 1, wherein the step of adaptively adjusting the reference volume includes the step of:

decreasing the reference volume when the detected aberration is characterized by a sudden deceleration of the input shaft prior to the predicted achievement of on-coming clutch torque capacity.

7. The control method of claim 6, including the steps of:

determining a fluid volume error according to an amount by which the determined cumulative volume increases between an initial detection of the input shaft deceleration and the predicted achievement of on-coming clutch torque capacity; and decreasing the reference volume as a function of the determined fluid volume error.

8. The control method of claim 1, wherein the step of monitoring the input speed includes:

monitoring the input speed to detect aberrations characterized by (a) a flare in the input speed after the predicted achievement of on-coming clutch torque capacity, (b) a pull-down of the input speed prior to the predicted achievement of on-coming clutch torque capacity, and (c) a sudden deceleration of the input shaft prior to the predicted achievement of on-coming clutch torque capacity.

9. The control method of claim 8, wherein the step of adaptively adjusting the reference volume in response to a detected aberration includes the steps of:

increasing the reference volume when the detected aberration is characterized by (a); and decreasing the reference volume when the detected aberration is characterized (b) or (c) without a detected aberration characterized by (a).

10. The control method of claim 1, including the step of:

periodically decreasing the reference volume by a predetermined incremental amount if no aberrations are detected.

* * * * *